(12) United States Patent
Alperovitch

(10) Patent No.: US 6,331,196 B1
(45) Date of Patent: Dec. 18, 2001

(54) LOW TURBULENCE CO-CURRENT CYCLONE SEPARATOR

(75) Inventor: Vladimir Alperovitch, Sde Boker (IL)

(73) Assignee: Negev Tornado Ltd., Sde Boker (IL)

( * ) Notice: Subject to any disclaimer, the term of this patent is extended or adjusted under 35 U.S.C. 154(b) by 0 days.

(21) Appl. No.: 09/584,487

(22) Filed: Jun. 1, 2000

(51) Int. Cl.$^7$ .................................................. B01D 45/16
(52) U.S. Cl. .......................................................... 55/459.1
(58) Field of Search ................................. 55/459.1, 449

(56) References Cited

U.S. PATENT DOCUMENTS

| | | | |
|---|---|---|---|
| 1,960,887 | * 5/1934 | Alexander | 55/459.1 |
| 3,501,014 | * 3/1970 | Fitch, Jr. et al. | 55/459.1 |
| 5,186,836 | * 2/1993 | Gauthier et al. | 55/459.1 |
| 5,587,078 | * 12/1996 | LeBlanc | 55/459.1 |

* cited by examiner

Primary Examiner—Robert A. Hopkins
(74) Attorney, Agent, or Firm—Mark M. Friedman

(57) ABSTRACT

A co-current cyclone separator comprised of (a) a cyclone housing having a cylindrical section of diameter $D_{cycl}$ and having a cover; (b) a tangential inlet fitting for introducing a cyclone feed mixture, the cyclone feed mixture containing a fluid and suspended mechanical particles; (c) an axial exhaust nozzle having an inlet diameter $D_{out}$, for discharging said fluid; and (d) a dust-collecting bin for collecting the suspended mechanical particles, wherein the suspended mechanical particles are largely removed from the cyclone feed mixture and collected in the dust-collecting bin, thereby reducing the concentration of the suspended mechanical particles in the fluid discharged through the axial exhaust nozzle, and wherein the ratio of $D_{cycl}$ to $D_{out}$ is in the range of 3:1 to 20:1.

16 Claims, 6 Drawing Sheets

LOW TURBULENCE CO-CURRENT CYCLONE SEPARATOR

FIELD AND BACKGROUND OF THE INVENTION

The present invention relates to an apparatus for separating a dense phase from a light phase, and, in particular, to the cleaning of fluid media containing fine and/or ultra-fine particles.

Cyclone separators are known to be one of the least expensive means of dust collection from both an operating and an investment viewpoint, and is the most widely used type of dust collection equipment in the chemical and mineral process industries.

In cyclone separators, a gas laden with fine particles ("dust") enters through a tangential opening. The inertia of the fine particles tends to drive these particles toward the outside wall of the separator, from which they are led into a receiver and are subsequently discharged from the cyclone.

The vast majority of commercially-used cyclones are of the reverse flow (also known as indirect) cyclone in which the feed mixture containing the dust-laden fluid is typically introduced into the cyclone near the top end of the vessel, the flow being substantially tangential to the cylindrical portion of the cyclone. The fluid path involves a double vortex with the gas spiraling downward at the outside and upward at the inside. Upon entering the cyclone, he fluid velocity undergoes a redistribution so that the tangential component of velocity increases with decreasing radius. Having changed direction, the fluid phase moves in a counter-current manner relative to the dense phase moving along the outside wall of the separator.

Cyclones for removing solids from gases are generally applicable when particles of over 5 microns diameter are involved. Cyclones with very small diameters (and throughput) have been known to attain efficiencies of 80–85% on particles having a 3 micron diameter.

According to the "Chemical Engineering Handbook" (Perry and Chilton, Fifth Edition, McGraw-Hill, 1973), the collection efficiency in the removal of dusts can be changed by only a relatively small amount by a variation in operating conditions. The primary design factor that can be utilized to control collection efficiency is the cyclone diameter, a smaller diameter unit (operating at a fixed pressure drop) having the higher efficiency.

Soviet Union Patent No. 507,364 teaches a reverse cyclone separator for the separation of solid particles from a gas. The cyclone has a cylindrical-conical housing with a tangential inlet fitting, and an exhaust nozzle and a dust discharge port, both coaxial with the housing. The patent claims improved cleaning efficiency due to the fact that the diameters of exhaust nozzle and dust discharge port measure 0.4 and 0.2 of diameter D of the cylindrical part of the housing, respectively, while the cross-sectional area $F_{in}$ of inlet fitting equals to 0.06 of the diameter D of the cylindrical part of the housing squared. It is also indicated in the referenced patent that $F_{in}$ shall not be less than $0.055D^2$ and that he cyclone diameter to exhaust nozzle ratio $D_{cycl}/D_{ex}$ shall not be greater than 2.5; otherwise, the cyclone resistance becomes exceedingly high.

According to the referenced description, a cyclone having a diameter of 400 mm provides a 95% efficiency when cleaning air from quartz dust with a median particle diameter of 14 microns.

A second, much less common type of cyclone is the co-current cyclone in which the exhaust nozzle and a dust discharge port are both coaxial with the housing, and the gas and dust-rich phase are discharged at the same end of the vessel in a co-current fashion.

U.S. Pat. No. 5,186,836 to Gauthier et al. discloses a co-current separator for the separation of a light phase from a mixture containing a light phase and a dense phase. Disposed downstream in the direction of circulation of the dense phase is an internal output opening of an interior enclosure. Fins are provided on the interior enclosure for limiting the progression of the light phase to the outside of the interior enclosure. The mixture is introduced tangentially into an inlet, and the dense phase is recovered at one outlet with the light phase recovered at another outlet. The co-current design makes it possible to rapidly separate the dense phase from the light phase.

The above-mentioned fins are intended to reduce the penetration of whirl from the separation chamber (a space between the cyclone cover and the output end of exhaust nozzle) into the bin, thereby reducing the reentrainment of fine particles from the bin.

According to U.S. Pat. No. 5,186,836, the recommended ratio of the cyclone diameter to exhaust nozzle output end diameter should be in the range from 1.7 to 2.5. The cyclone is designed to effect a very rapid separation between a dense phase and a light phase with a particularly narrow residence time distribution. The above-mentioned patent claims that the disclosed apparatus is effective in separating pellets with a diameter of 30 microns. It is manifestly evident to those skilled in the art that the above-mentioned cyclones do not provide an effective cleaning solution for fluids contaminated with particles in the range of 1–5 microns and in the sub-micron range.

One criterion for evaluating cyclone performance is the ratio of cleaning efficiency η% to the cyclone resistance for the cleaning of unit volume of contaminated fluid from suspended particles of a given median diameter:

$$K_{eff} = \frac{\eta\%}{W} = \frac{\eta\% * \Delta P}{Q}$$

where η%=$(1-C/C_0)100\%$, and $C_0$ are the suspended particle concentrations downstream and upstream of the cyclone correspondingly; W, the cyclone resistance, equals Q/ΔP, where Q is the flow of fluid in $m^3/s$ and ΔP is the pressure drop of the apparatus.

The above equation shows that, given flow Q, two factors, the cleaning and the resistance, compete with one another. If the fluid to be cleaned represents gas, with the increase of dispersion of dust to be separated, the cleaning level of known cyclones rapidly decreases to 50–60% for 10-μm dust and to as low as 1% for 1–3-μm dust [A. K. Gupta et al., "Swirl Flows", Abacus Press (1984)].

Known cyclones are incapable of separating extremely fine dusts because the strong turbulence of flow greatly increases the effective flow viscosity. It is known that the effective viscosity in highly-turbulent flow regimes can be 10–100 times the viscosity of the same fluid in a laminar flow regime (Trans. Inst. Chem. Engrs., Vol. 51, 1973; Gupta et al.). The frictional forces in the cyclone, which are proportional to the effective viscosity, increase appreciably, resulting in a drastically reduced cleaning efficiency.

Moreover, such turbulence is a predominant factor behind the existence of a lower limit of cleaning in existing cyclones. It is known that the centrifugal force removing a particle from the flow is proportional to dust particle diameter cubed, $d_d^3$, while the friction force due to the radial component, is proportional to $d_d$ (Trans. Inst. Chem. Engrs., Vol. 51, 1973; Gupta et al.). As a result, with decreasing particle diameter, the centrifugal force decreases much faster than the frictional force, and the trajectories of the particles tend to approach the fluid streamlines.

However, it is also known that the centrifugal force is proportional to the tangential velocity squared, $V_t^2$, while the frictional force is proportional to the radial component of velocity, $V_r$. Therefore, to improve the cleaning efficiency, the inlet (feed) flow velocity should be increased in order to increase the tangential velocity component. However, in existing cyclones, an increase in the inlet velocity results in increased turbulence. Because the frictional force also increases with increasing turbulence, there exists a high inlet velocity at which the increase in tangential velocity ceases to improve the cleaning efficiency due to increased frictional forces (resulting from the increased flow viscosity). Clearly, increasing the inlet velocity in existing cyclones beyond this point would only impair the cleaning quality. Thus, there is an inherent upper limit of cleaning in existing cyclones, such that high-efficiency separation of particles with a diameter of less than 5 microns is highly impractical or substantially impossible.

Moreover, the turbulence in existing cyclones severely decreases the tangential velocity component as compared with the ideal laminar flow case. In the ideal case, according to the angular momentum conservation law $$rV_t = \text{constant},$$

$V_t$ increases in an inversely-proportional manner to the rotation radius r, attaining a maximum at the radius of the discharge nozzle (where the radius of the vessel is minimized). In practice, however, the inlet velocity ($V_{in}$) of known cyclones is typically 20–25 m/s (with the tangential component of the inlet velocity virtually equaling $V_{in}$ due to the tangential inlet fitting), whereas at the discharge nozzle outlet, the tangential velocity does not exceed 3–4 m/s (Gupta, et al.), well below the theoretical value for laminar flow.

The cyclone power consumption is known to be proportional to the inlet and outlet velocities squared. The fraction of the input energy that is actually spent on cleaning is calculated by the ratio $$V_t^2/(V_t^2 + V_{in}^2),$$

wherein $V_t$ is the tangential component of velocity at the radius of the outlet and $V_{in}$ is the inlet velocity. Using this relationship, it can be seen that for known cyclones, the kinetic energy that is actually spent on cleaning amounts to only about 2% of the kinetic energy in the inlet flow ($V_{in}$).

There is therefore a recognized need for, and it would be highly advantageous to have, a cyclone separator that provides improved separation of ultra-fine particulate matter, and more particularly, a cyclone separator that provides improved separation of ultra-fine particulate matter in a simple and cost-efficient manner.

SUMMARY OF THE INVENTION

According to the teachings of the present invention there is provided a co-current cyclone separator comprised of: (a) a cyclone housing having a cover, (b) a tangential inlet fitting for introducing a cyclone feed mixture containing a fluid and suspended mechanical particles, (c) an axial exhaust nozzle for discharging the fluid, and (d) a dust-collecting bin for collecting the suspended mechanical particles, wherein the suspended mechanical particles are largely removed from the cyclone feed mixture and collected in the dust-collecting bin, thereby reducing the concentration of the suspended mechanical particles in the fluid discharged through the axial exhaust nozzle, and wherein the co-current cyclone separator has geometric parameters that are determined by the relationship:

$$h = \frac{D_{out} \mu S_{in}^2}{K \rho D_{cycl} d_p^2 Q},$$

wherein h=distance between the cover and the output end of the axial exhaust nozzle, in meters;

$D_{out}$=inlet diameter of the axial exhaust nozzle, in meters;

$\mu$=dynamic viscosity of the fluid, in Pa·s;

$S_{in}$=cross-sectional area of the tangential inlet fitting, in square meters;

K=coefficient;

$\rho$=dust particle density, in kg/m³;

$D_{cycl}$=diameter of the cyclone housing near the tangential inlet fitting, in meters;

$d_p$=cut point, in microns;

Q=volumetric flowrate of the cyclone feed mixture, in m³/s, and wherein the fractional cleaning efficiency coefficient K is in the range between 5 and 250.

According to further features in preferred embodiments of the invention described below, the fractional cleaning efficiency coefficient K is in the range between 20 and 100.

According to still further features in preferred embodiments of the invention described below, the ratio of $D_{cycl}$ to $D_{out}$ is in the range of 3:1 to 20:1, and more preferably, in the range of 5:1 to 10:1.

According to still further features in preferred embodiments of the invention described below, the cyclone housing has a substantially conical section having a taper angle $\alpha$ in the range of 0° to 20°, and more preferably, in the range of about 4° to about 8°.

According to still further features in preferred embodiments of the invention described below, inserts having slots are situated between the internal surface of the cyclone housing and the axial exhaust nozzle. Preferably, the inserts have slots narrowing in the direction of the axial exhaust nozzle and making an angle of not less than 90° with the axis of the cyclone housing.

According to still further features in preferred embodiments of the invention described below, the ratio of the cross-sectional area of the opening at the entrance to the slot ($S_1$) to the cross-sectional area of the opening at the exit from the slot ($S_2$) is at least 1:1. Preferably, the ratio of $S_1$ to $S_2$ is 2:1 to 10:1.

According to still further features in preferred embodiments of the invention described below, the axial exhaust nozzle within the cyclone housing has an inlet end and an outlet end, wherein the inlet end widens at an angle P in the direction of the outlet end, the angle $\beta$ being within the range of 7° to 30°.

According to still further features in preferred embodiments of the invention described below, the cyclone exhaust nozzle has a rounded inlet opening having a rounding radius $R_1$ at the inner diameter of the opening and a rounding radius $R_2$ at the outer diameter of the opening, such that $R_2$ is greater than $R_1$.

In another aspect of the present invention there is provided a co-current cyclone separator comprised of: (a) a tangential inlet fitting for introducing a cyclone feed mixture containing a fluid and suspended mechanical particles, (b) a cyclone housing having a diameter $D_{cycl}$ near the tangential inlet fitting and having a cover, (c) an axial exhaust nozzle having an inlet diameter $D_{out}$ for discharging the fluid., and (d) a dust-collecting bin for collecting the suspended particles, wherein the suspended particles are largely removed from the cyclone feed mixture and collected in the dust-collecting bin, thereby reducing the concentration of the suspended mechanical particles in the fluid discharged through the axial exhaust nozzle, and wherein the ratio of $D_{cycl}$ to $D_{out}$ is in the range of 3:1 to 20:1.

According to further features in preferred embodiments of the invention described below, the ratio of $D_{cycl}$ to $D_{out}$ is in the range of 5:1 to 10:1. This ratio is particularly preferable for cyclones with diameters exceeding 1 meter.

According to still further features in preferred embodiments of the invention described below the fluid introduced to the cyclone includes a gas. According to still further features in preferred embodiments of the invention described below the fluid introduced to the cyclone includes at least one liquid.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
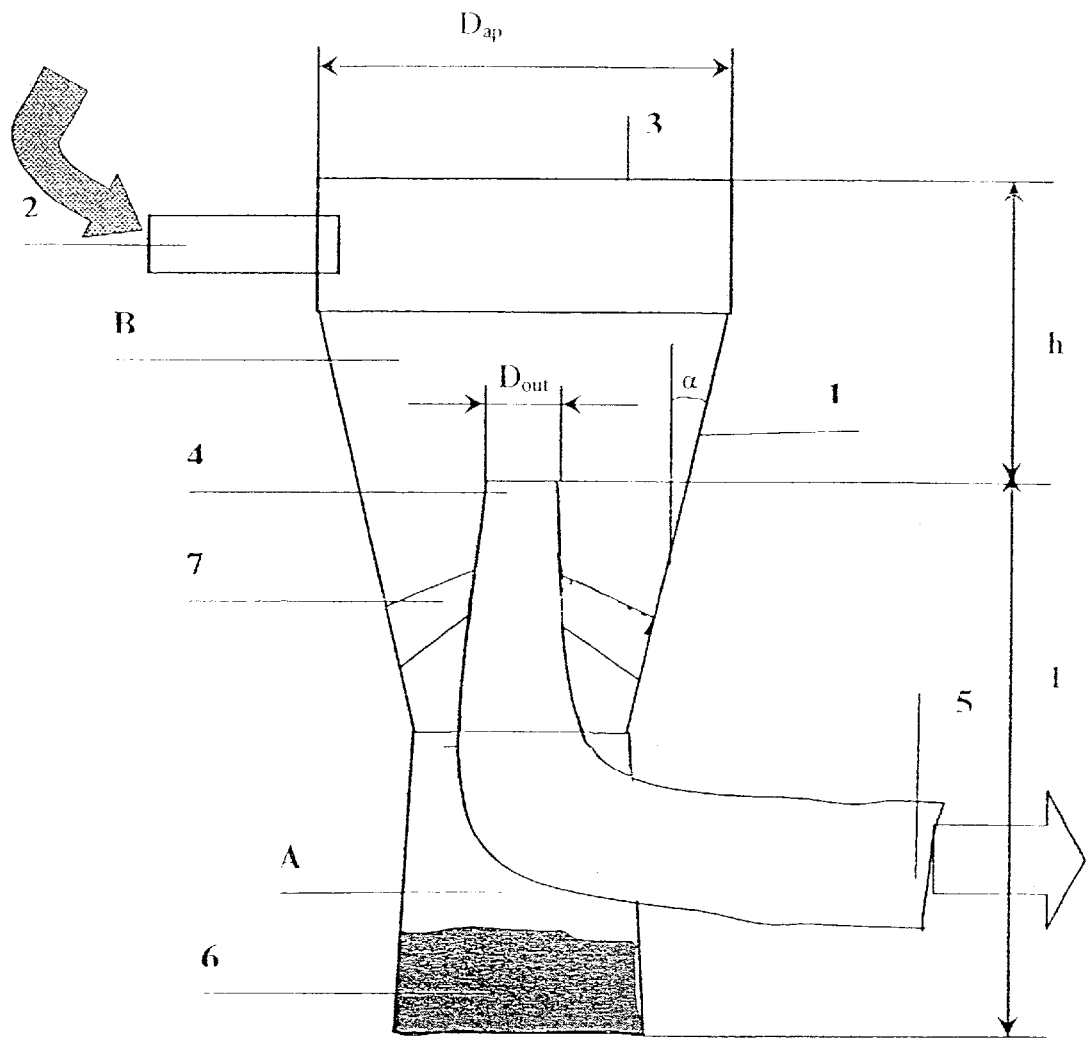
FIG. 1 is a schematic diagram of a co-current cyclone separator according to the present invention.

The present invention is a co-current cyclone separator having a flow with very low turbulence. With fluids containing solid particles, the co-current cyclone separator of the present invention can achieve cut points that are considerably smaller than cut points of cyclone separators of the prior art.

Co-current cyclone separators of the prior art achieve cut points of 10–150 microns, and indirect cyclone separators of the prior art achieve cut points of 5–50 microns. In special cases, indirect cyclone separators of the prior art achieve cut points of about 3 microns, but with an efficiency of 5–50%.

By sharp contrast, the co-current cyclone separator according to the present invention can effect separations with cut points of less than 1 micron, and in many cases, the effected cut point is in the range of 0.01–0.1 micron. Moreover, in some instances the co-current cyclone separator according to the present invention can attain a separation efficiency of as much as 80–99% in the sub-micron range.

The principles and operation of the co-current cyclone separator of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

As used herein in the specification and in the claims section that follows, the term "cut point" refers to the particle diameter at which the separation efficiency is 50%.

Referring now to the drawings, FIG. 1 is a schematic diagram of a co-current cyclone separator according to the present invention. The cyclone includes a cylindrical-conical housing 1 and a tangential inlet fitting 2, mounted in the upper cylindrical part of housing 1. Housing 1 is closed at the top with a cover 3. Mounted in the lower, conical section of housing 1 and concentric to the cyclone axis is an exhaust nozzle 4 with a gradual 90° elbow that widens toward outlet end 5b. Mounted below the conical section of the housing 1 is a bin 6 for collecting the separated dust in the case of gaseous fluid. In the case of a liquid fluid, a standard drainage fitting (not shown) is attached.

The cyclone of the present invention operates as follows: fluid containing a suspension of mechanical particles is fed to working volume B of housing 1 through inlet fitting 2; the fluid executes a rotational motion relative to the housing 1 axis (the tangential component $V_t$ of the velocity vector), an axial motion from cover 3 toward the outlet opening of nozzle 4 (the axial component $V_{ax}$ of velocity vector) and a radial motion from the housing circumference toward its axis (the radial component $V_r$ of velocity vector).

Under the action of centrifugal force, the suspended particles migrate toward the walls of housing 1. While accumulating at the internal side of housing 1, walls, the dust gradually moves in the direction of axial component of stream being cleaned and penetrates via channels 8 of inserts 7 into working volume A of bin 6. In this process, dust is often agglomerated due to coagulation, thus improving the quality of cleaning. The purified fluid is discharged via the exhaust nozzle 4.

In FIG. 1, $D_{cycl}$ is the diameter of the cylindrical part of cyclone housing, i.e., the diameter of the housing near the tangential inlet fitting 2; $D_{out}$ is the diameter of exhaust nozzle; h is the distance between the cyclone cover 3 and the inlet end 5a of the exhaust nozzle 4; is the distance between the bottom of bin 6 and the output end 5b of exhaust nozzle 4; α is the taper angle of the conical part of housing 1.

In the cyclone according to the present invention, the cleaning process is implemented in an aerodynamic mode characterized by an extremely low level of turbulence. The low turbulence level is achieved by the geometry of the cyclone and its inner workings and operating conditions, taking into account the properties of the fluid, the suspended solids, and the desired cut point.

Thus, according to one aspect of the present invention there is provided a co-current cyclone separator comprised of (a) a tangential inlet fitting for introducing a cyclone feed mixture, the cyclone feed mixture containing a fluid and suspended particles; (b) a cyclone housing having a diameter $D_{cycl}$ near the tangential inlet fitting and having a cover; (c) an axial exhaust nozzle having an inlet diameter $D_{out}$, for discharging the fluid; and (d) a dust-collecting bin for collecting the suspended mechanical particles, wherein the suspended particles are largely removed from the cyclone feed mixture and collected in the dust-collecting bin, thereby reducing the concentration of the suspended particles in the fluid discharged through the axial exhaust nozzle, and wherein the ratio of $D_{cycl}$ to $D_{out}$ is in the range of 3:1 to 20:1.

The range of $D_{cycl}/D_{out}$ ratio is influenced by the following considerations: at $D_{cycl}/D_{out}<3$ the flow mode changes and a strong turbulence develops, while at $D_{cycl}/D_{out}>15$ the cyclone resistance starts to increase rapidly due to flow contraction losses in the exhaust nozzle. However, if a high cleaning level is required, it may become suitable to use a $D_{cycl}/D_{out}$ ratio of 20:1 or more, despite high power requirements of cleaning.

Preferably, the $D_{cycl}/D_{out}$ ratio is about 5:1 to about 10:1. For cyclones with large diameters ($D_{cycl}/D_{out}>1$ meter), the most preferred ratio of $D_{cycl}/D_{out}$ is about 7:1 to about 10:1.

In another aspect of the present invention there is provided a co-current cyclone separator comprised of: a cyclone housing having a cover; a tangential inlet fitting for introducing a cyclone feed mixture containing a gas and suspended particles; an axial exhaust nozzle for discharging the gas; and a dust-collecting bin for collecting the suspended mechanical particles, wherein the suspended particles are largely removed from the cyclone feed mixture and collected in the dust-collecting bin, thereby reducing the concentration of the suspended mechanical particles in the gas discharged through the axial exhaust nozzle, and wherein the co-current cyclone separator has geometric parameters that are determined by the relationship:

$$h = \frac{D_{out} \mu S_{in}^2}{K \rho D_{cycl} d_p^2 Q},$$

wherein h=distance between the cyclone cover and the output end of the axial exhaust nozzle, in meters;

$D_{out}$=inlet diameter of the axial exhaust nozzle, in meters;

$\mu$=dynamic viscosity of the gas, in Pa·s;

$S_{in}$=cross-sectional area of the tangential inlet fitting, in square meters;

K=coefficient;

$\rho$=dust particle density in kg/m$^3$;

$D_{cycl}$=diameter of cyclone housing near the tangential feed inlet, in meters;

$d_p$=cut point (50%), in microns;

Q=volumetric flowrate of the cyclone feed mixture, in m$^3$/s, and wherein the coefficient K is in the range of 5 to 250. The coefficient K typically ranges between 0.005 and 0.02 in co-current cyclones of the prior art. For most applications, the coefficient K is preferably in the range of 20 to 100.

Figure 2:
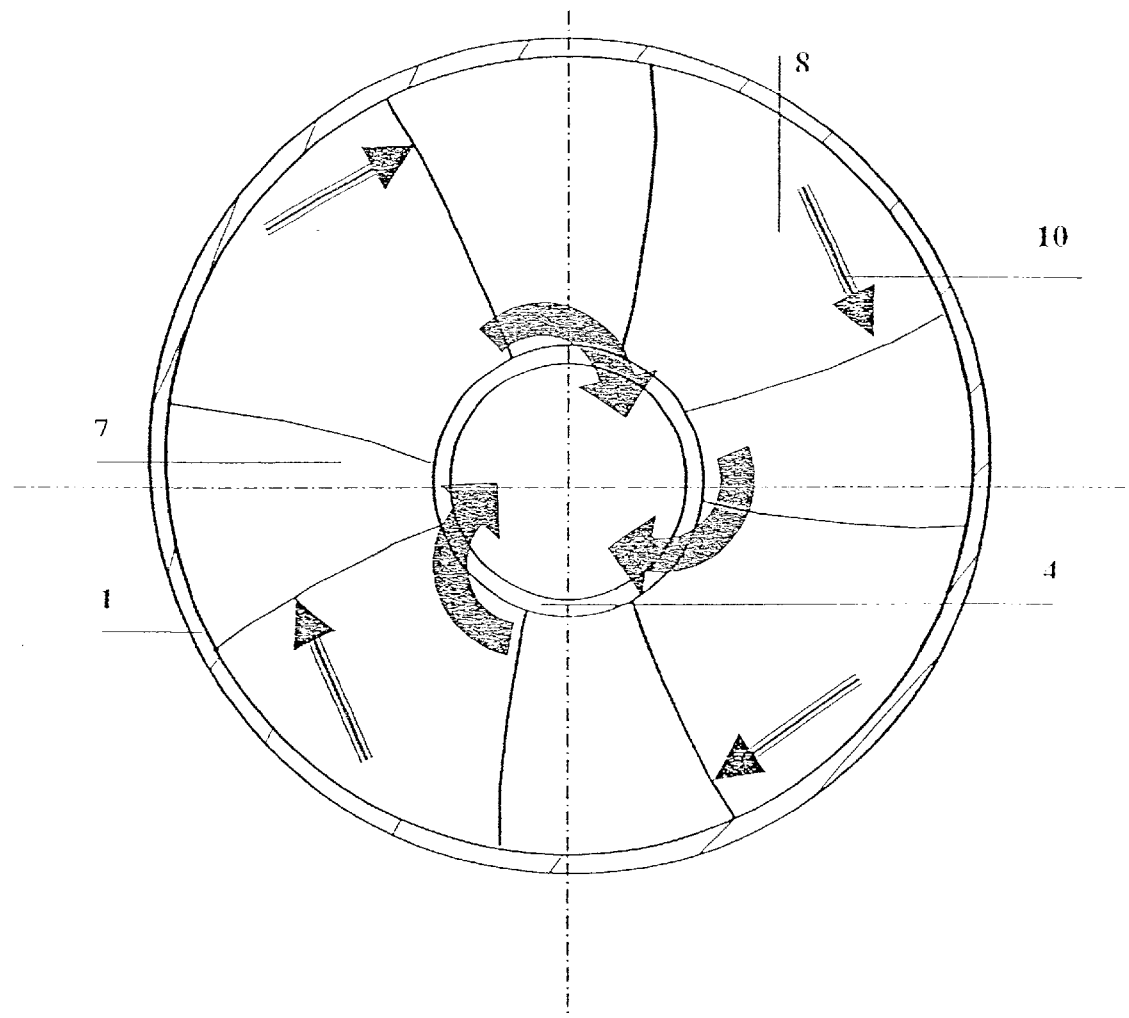
FIG. 2 is a schematic axial cross-sectional view of the co-current cyclone in which the effect of the inserts and slots on the aerodynamic pattern is shown.

FIG. 2 is a schematic axial cross-sectional view of the co-current cyclone in which the effect of the insert 7 and slots 8 on the aerodynamic pattern is shown. The direction of the current is the same as the direction of the fluid through the tangential inlet fitting (not shown). The alignment of the slot openings 8 is substantially perpendicular to the direction of the current 10. The high specific gravity of the solid particles carries the particles towards the periphery of the cyclone housing 1, where they enter the slots 8 and subsequently drop into the dust bin (not shown). The cleaned fluid enters the inlet port of the exhaust nozzle 5a and is discharged.

Figure 3:
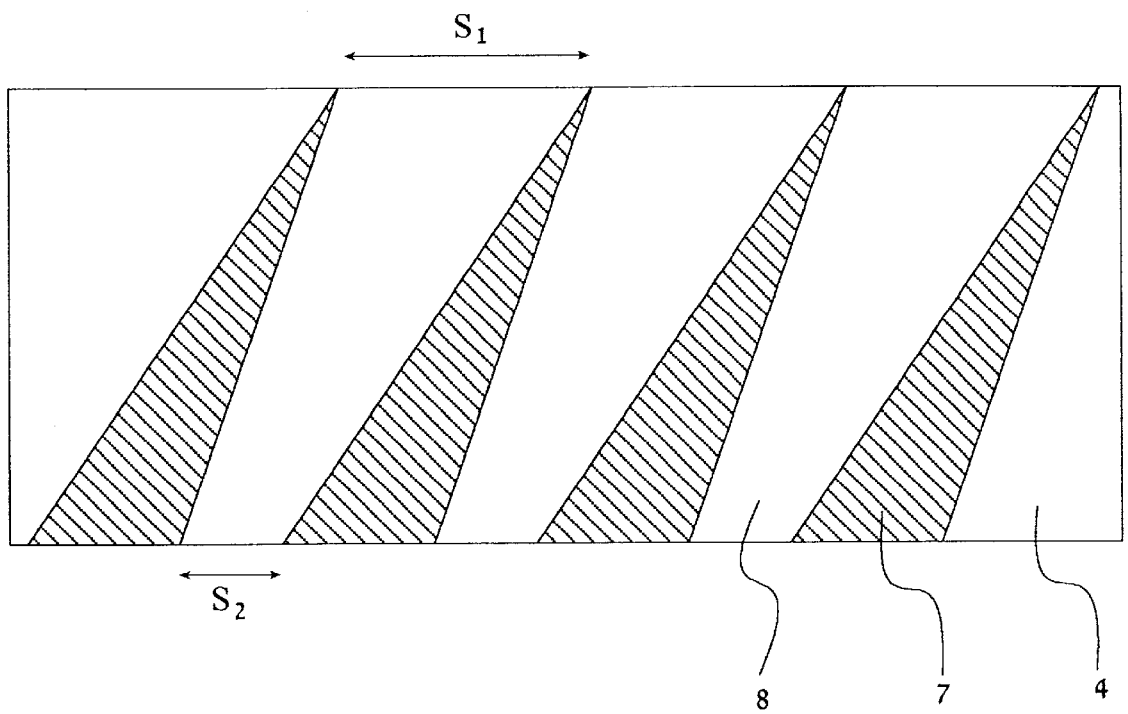
FIG. 3 is a lateral, cut open view of the inserts affixed to the exhaust nozzle.

FIG. 3 is a lateral, sectional, cut open view of four inserts (or blades) 7 affixed to the exhaust nozzle 4. The section of the exhaust nozzle 4 shown has been cut and flattened to produce a near-rectangular shape. The four inserts 7 affixed to the exhaust nozzle 4 have a triangular profile. In between the inserts are slots 8. The top (entrance) of the slot 8 has an opening having a cross-sectional area $S_1$, and the bottom of the slot 8 has a narrower opening having a cross-sectional area $S_2$. The relationship between the openings is described in greater detail below.

Figure 4:
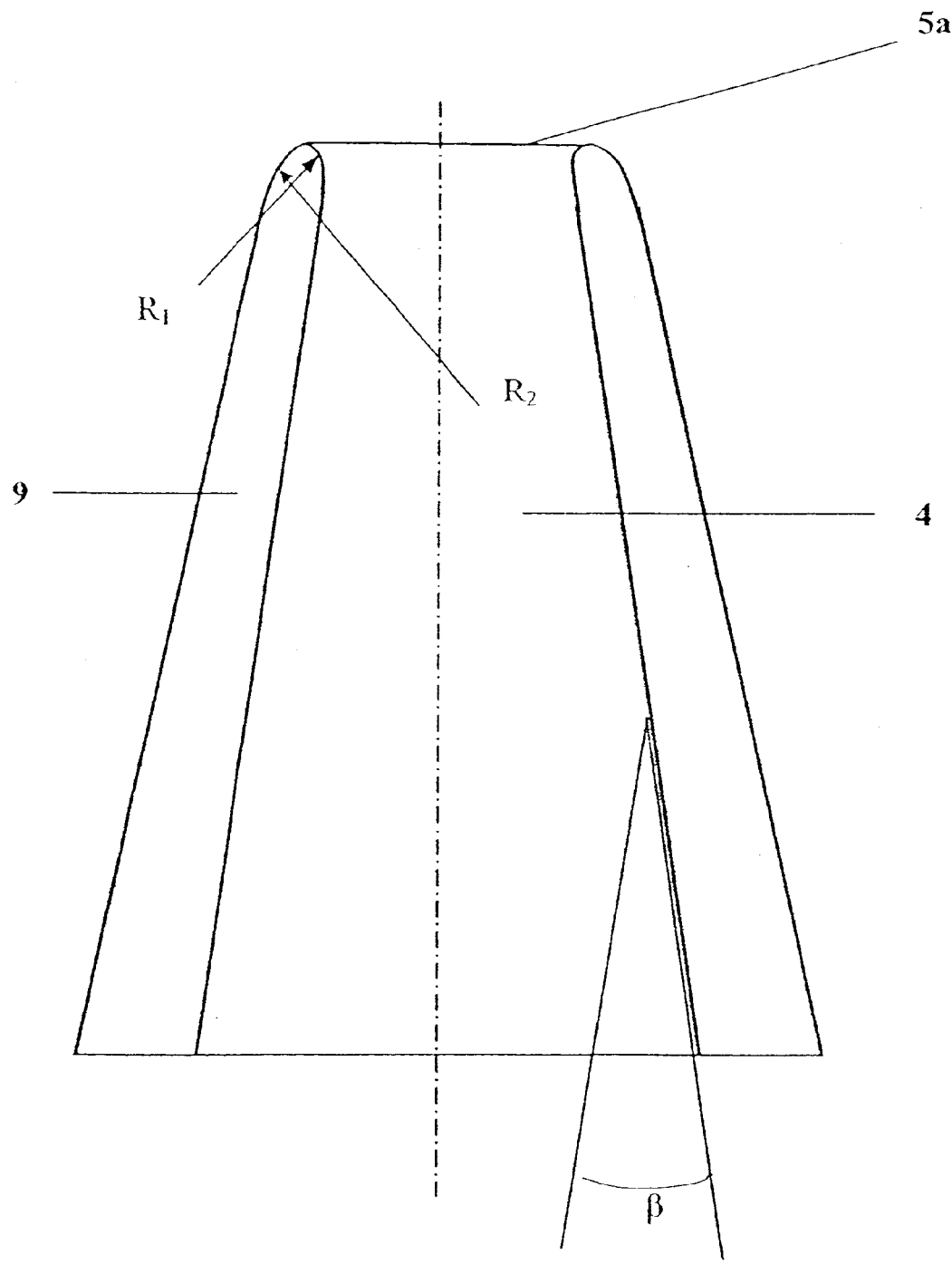
FIG. 4 is a schematic sectional view of an exhaust nozzle according to a preferred embodiment of the present invention.

FIG. 4 is a schematic sectional view of an exhaust nozzle 4 according to a preferred embodiment of the present invention. The exhaust nozzle 4 widens from the inlet 5a in the direction of the outlet (not shown) in a conical fashion. The angle of divergence of the conical exhaust nozzle 4, $\beta$, is preferably in the range of about 7° to about 30°.

The walls 9 of the exhaust nozzle 4 are rounded by the inlet 5a. The inlet 5a opening has a rounding radius $R_1$ at the inner diameter and a rounding radius $R_2$ at the outer diameter. Preferably, outer rounding radius $R_2$ is larger than the inner rounding radius $R_1$.

The streamlined shape of the exhaust nozzle 4 allows a reduced level of local turbulence at the exit of working volume B (see FIG. 1) and thus prevents a reduction of the cleaning efficiency that is characteristic of known cyclones. In addition, the conical form of the exhaust nozzle 4 reduces the flow velocity in the stream leaving the cyclone and thus allows to reduce the specific aerodynamic resistance ($Q/\Delta P$) to the cleaning of contaminated flow.

Referring again to FIG. 1: In another preferred embodiment of the present invention, the taper angle ($\alpha$) of the conical part of the cyclone housing 1 is between 0° and 20°, and more preferably, between 4° and 8°. Below an angle of about 20°, the narrowing in the conical section of the housing 1 increases the tangential velocity according to the law of conservation of angular momentum. However, with a taper angle exceeding about 20°, the particles tend to rebound from the wall, thereby reducing the near-wall coagulation of particles and increasing reentrainment. In addition, an exaggerated increase in the taper angle adversely affects the aerodynamic mode (laminar regime transforms to turbulent regime), thereby impairing separation.

Inserts 7 (FIG. 1, FIG. 3) are intended to prevent a drop in the tangential component of velocity caused by the penetration of rotating flow into the bin 6. Without inserts 7, this component would be substantially lower, since the tangential component of velocity at the output end of the inlet fitting 2 drops in proportion to the length (h+l) of the cyclone housing 1 and, in the absence of inserts 7, the length of cyclone increases by the factor f=(h+l)/h. Therefore, with inserts 7, the tangential component of velocity increases by a factor off as compared with the same cyclone without inserts. Thus, inserts 7 present an impenetrable barrier to the rotational component of the flow (dynamic resistance), yet are easily pervious for dust.

In contrast with the inserts taught by U.S. Pat. No. 5,186,836, the inserts of the present invention have a streamlined shape, such that the flow is disturbed and cleaning is improved. Based on experimental investigation, e gap width in the narrowing slots, as determined from the relationship $S_1/S_2$, greater than 1:1, and preferably between 2:1 and 10:1, where $S_1$ and $S_2$ are the ross-sectional areas of the slot openings as defined above (see FIG. 3).

It should be emphasized that the cyclone of the present invention can be operated without the above-described inserts, albeit with reduced efficiency. In some cases (e.g., feed fluids containing sticky particles), it is actually advantageous to operate the cyclone without these inserts.

In another preferred embodiment of the present invention, the taper angle of the conical part of the cyclone housing is less than or equal to 0°. This geometry is particularly appropriate for sticky materials that tend to accumulate on the cyclone walls.

Figure 5:
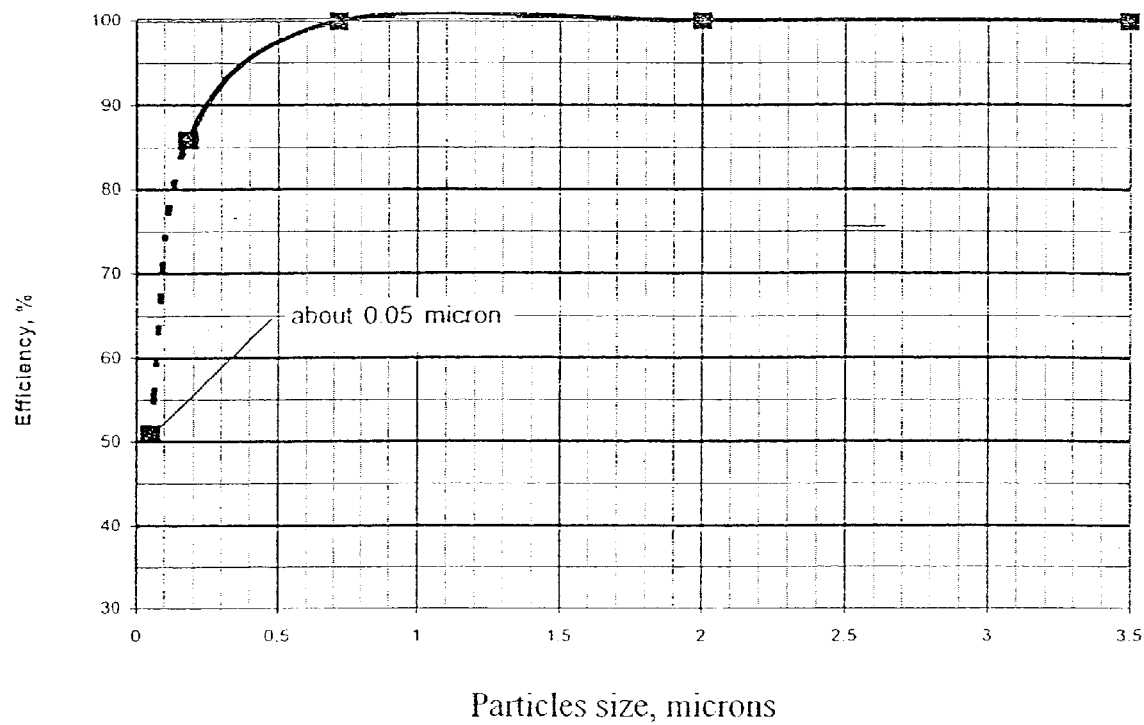
FIG. 5 is a fractional cleaning curve for a cyclone according to a preferred embodiment of the present invention.

FIG. 5 is a fractional cleaning curve for a cyclone according to a preferred embodiment of the present invention. The co-current cyclone has a diameter ($D_{cycl}$) of 0.4 meters, a height (h) of 1.0 meter, and an outlet diameter at the entrance to the exhaust nozzle ($D_{out}$) of 0.05 meters. The flowrate (Q) is 0.01 m³/s. The separation efficiency of 1 micron (in diameter) particles is 94%, and the separation efficiency of 0.5 micron particles is 80%. The cut point of the cyclone is approximately 0.2 microns.

Figure 6:
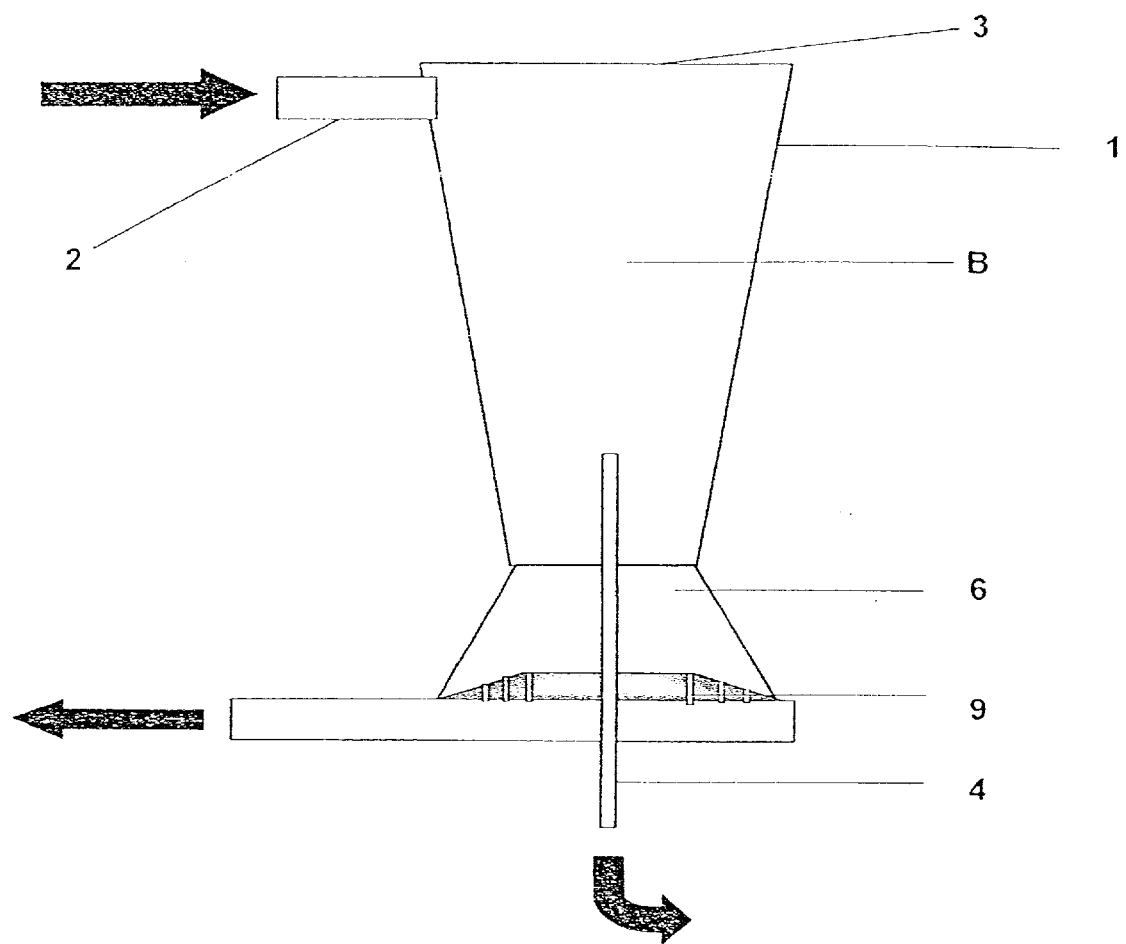
FIG. 6 is a schematic diagram of a co-current cyclone separator for liquid applications, according to the present invention.

FIG. 6 is a schematic diagram of a co-current cyclone separator for liquid applications, according to the present invention. The cyclone includes a conical housing 1 and a tangential inlet fitting 2, mounted in the upper part of the conical housing 1. The housing 1 is closed at the top with a cover 3. Mounted in the lower, conical section of housing 1 and concentric to the cyclone axis is an exhaust nozzle 4. Mounted below the conical section of the housing 1 is a compartment 6 for collecting the separated dense liquid.

In liquid applications, the cyclone of the present invention is used to separate liquids having different specific gravities, and/or to separate particles having a lower specific gravity than the mother liquor. Let us consider a mixture of immiscible liquids having different specific gravities. The mixture is fed to working volume B of housing 1 through inlet fitting 2; the fluid executes a rotational motion relative to the housing 1 axis (the tangential component $V_t$ of the velocity vector), an axial motion from cover 3 toward the outlet opening of nozzle 4 (the axial component $V_{ax}$ of velocity vector) and a radial motion from the housing circumference toward its axis (the radial component $V_r$ of velocity vector).

Under the action of centrifugal force, the liquid having the higher specific gravity migrates toward the walls of housing 1, flows into the lower compartment, and is discharged from the vessel via capillary-like tubes 9 in the bottom of the housing 1. The purified liquid of lower density is discharged via the exhaust nozzle 4.

EXAMPLES

Reference is now made to the following examples, which together with the above description, illustrate the invention in a non limiting fashion.

Example 1

Aerodynamic Properties of the Cyclone According to the Present Invention.

In a cyclone with a housing diameter ($D_{cycl}$) of 1.5 m, an outlet diameter $D_{out}$) of 0.2 m, and a total height of 4 m, the inlet feed velocity $V_{in}$ was 12 m/s, and the tangential component of velocity ($V_t$) at the radius of the exhaust nozzle exceeded 50 m/s. Therefore, according to the equation $$100*(Vt)^2/[(Vt)^2+(V_{in})^2],$$

the percentage of energy available for cleaning exceeded 95%.

Example 2

Separation Efficiency of the Cyclone According to the Present Invention.

A cyclone having a housing diameter ($D_{cycl}$) of 0.193 m, an outlet diameter ($D_{out}$) of 0.05 m, a total height of 0.240 m, and an input velocity ($V_{in}$) of 7 m/s was used to separate (from air) $WO_3$ micropowder produced by the sublimation of polytungstate.

Virtually all of the powder particles were distributed in the range from 0.1 to 1.0 microns. All particles larger than 0.3 microns were separated.

The tests were performed with dust-laden air as a contaminated fluid. The test stand was specially designed according to ASHRAE 52–76, DIN 24185 and similar standards.

The dust, pre-weighed, together with a weighing bottle, was introduced in the cyclone through the input end of inlet fitting within a time interval controlled by a stop watch.

The quantity of dust fed into the cyclone was determined by the difference of weighing bottle masses before and after dusting. The efficiency η% of air cleaning from mechanical particles with a given median diameter was determined as η%=(1-C/C₀)*100%, where and $C_0$ are the suspended particle concentrations downstream and upstream of the cyclone correspondingly. In this scheme, the volumes of gas passing the cyclone input and output over the time of test are the same; therefore, the cleaning efficiency can be calculated as $$η\%=(1-/M_0)·100\%,$$

where M is the mass of dust caught by the filter, and $M_0$ is the mass of dust having been fed into the cyclone during the test period. Filters and weighing bottles were weighted in compliance with standard practice using the 120-mg Scientech SA scale. The weighting error did not exceed 0.5 mg, the mass of batch in experiments was not less than 200 mg. The total error of the method as calculated by the above formula does not exceed 5% when determining the breakthrough coefficient (/M₀)·100%, therefore, at η%>90%, the error is less than 0.5%.

The cyclone resistance was determined as the pressure difference between the cyclone input (1 atm.) and output and measured by water piezometers calibrated by the Dwyer Magnehelic pressure gage, model 2004. The measuring point was offset by 10–40 diameters of the exhaust nozzle from its output end, so that the output swirl had enough time to be completely destroyed.

The gas flow was determined using the Invorio DK variable area glass flowmeter, (air flow range 100–1000 liter/h, accuracy 2.5%). Greater flows were measured using a standard Pitot tube.

The median diameter of dust particles at the cyclone input and output was measured using the CETI (Belgium) optical microscope for particles larger than 2 microns; smaller diameters were measured with the SEM JEOL 6400 electronic scanning microscope and according to USEPA Method No. 5 using an Anderson Mark III Sizing Stack Sampler (multi-stage cascade impactor). Dust histograms were plotted using the obtained photographs. To provide the necessary statistical reliability level, more than 500 particles were used when plotting histograms. Based on these histograms, the fractional distribution of cleaning efficiency $\eta\%$, i.e. the $\eta\%$ dependence on the dust particle median diameter, was calculated.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A co-current cyclone separator comprised of:
   (a) a cyclone housing having a cover;
   (b) a tangential inlet fitting for introducing a cyclone feed mixture, said cyclone feed mixture containing a fluid and suspended mechanical particles;
   (c) an axial exhaust nozzle for discharging said fluid; and
   (d) a dust-collecting bin for collecting said suspended mechanical particles,
   wherein said suspended mechanical particles are largely removed from said cyclone feed mixture and collected in said dust-collecting bin, thereby reducing the concentration of said suspended mechanical particles in said fluid discharged through said axial exhaust nozzle,
   and wherein said co-current cyclone separator has geometric parameters that are determined by the relationship:

$$h = \frac{D_{out} \mu S_{in}^2}{K \rho D_{cycl} d_p^2 Q},$$

wherein
   h=distance between said cover and the output end of said axial exhaust nozzle, in meters;
   $D_{out}$=inlet diameter of said axial exhaust nozzle, in meters;
   $\mu$=dynamic viscosity of said fluid, in Pa·s;
   $S_{in}$=cross-sectional area of said tangential inlet fitting, in square meters;
   K=coefficient;
   $\rho$=dust particle density, in kg/m³;
   $D_{cycl}$=diameter of said cyclone housing near said tangential inlet fitting, in meters;
   $d_p$=cut point, in microns;
   Q=volumetric flowrate of said cyclone feed mixture, in m³/s,
   and wherein said fractional cleaning efficiency coefficient K is in the range between 5 and 250.

2. The co-current cyclone separator of claim 1, wherein said fractional cleaning efficiency coefficient K is in the range between 20 and 100.

3. The co-current cyclone separator of claim 1, wherein the ratio of $D_{cycl}$ to $D_{out}$ is in the range of 3:1 to 20:1.

4. The co-current cyclone separator of claim 1, wherein the ratio of $D_{cycl}$ to $D_{out}$ is in the range of 5:1 to 10:1.

5. The co-current cyclone separator of claim 1, wherein said cyclone housing has a substantially conical section having a taper angle $\alpha$, wherein $\alpha$ is in the range of 0° to 20°.

6. The co-current cyclone separator of claim 5, wherein said taper angle is in the range of about 4° to about 8°.

7. The co-current cyclone separator of claim 1, wherein said cyclone housing has an internal surface, and wherein inserts having slots are situated between said internal surface and said axial exhaust nozzle.

8. The co-current cyclone separator of claim 7, wherein said cyclone housing has an axis, and wherein said inserts have slots narrowing in the direction of said axial exhaust nozzle and making an angle of not less than 90° with said axis of said cyclone housing.

9. The co-current cyclone separator of claim 8, wherein $S_1$ is the cross-sectional area of the opening at the entrance to said slot, $S_2$ is the cross-sectional area of the opening at the exit to said slot, and wherein the ratio of $S_1$ to $S_2$ is at least 1:1.

10. The co-current cyclone separator of claim 9, wherein the ratio of $S_1$ to $S_2$ is 2:1 to 10:1.

11. The co-current cyclone separator of claim 1, said axial exhaust nozzle having an inlet end and an outlet end, wherein said inlet end widens at an angle $\beta$ in the direction of said outlet end, said angle $\beta$ being within the range of 7° to 30°.

12. The co-current cyclone separator of claim 1, wherein said cyclone exhaust nozzle has a rounded inlet opening having a rounding radius $R_1$ at the inner diameter and a rounding radius $R_2$ at the outer diameter, and wherein $R_2$ is greater than $R_1$.

13. A separating device comprised of:
   a co-current cyclone including:
      (a) a tangential inlet fitting for introducing a cyclone feed mixture, said cyclone feed mixture containing a fluid and suspended mechanical particles;
      (b) a cyclone housing having a diameter $D_{cycl}$ near said tangential inlet fitting and having a cover substantially sealing a top face of said housing;
      (c) an axial exhaust nozzle having an inlet diameter $D_{out}$, for discharging said fluid; and
      (d) a dust-collecting bin for collecting said suspended particles,
      wherein said suspended particles are largely removed from said cyclone feed mixture and collected in said dust-collecting bin, thereby reducing the concentration of said suspended mechanical particles in said fluid discharged through said axial exhaust nozzle, and wherein the ratio of $D_{cycl}$ to $D_{out}$ is in the range of 3:1 to 20:1.

14. The co-current cyclone separator of claim 13, wherein the ratio of $D_{cycl}$ to $D_{out}$ is in the range of 5:1 to 10:1.

15. The co-current cyclone separator of claim 13, wherein said fluid includes a gas.

16. The co-current cyclone separator of claim 13, wherein said fluid includes at least one liquid.

* * * * *